United States Patent [19]
Araya

[11] Patent Number: 5,904,914
[45] Date of Patent: May 18, 1999

[54] ALUMINOSILICATES

[75] Inventor: Abraham Araya, Bebington, United Kingdom

[73] Assignee: Crosfield Limited, Warrington, United Kingdom

[21] Appl. No.: 08/836,663

[22] PCT Filed: Oct. 24, 1995

[86] PCT No.: PCT/EP95/04195

§ 371 Date: Jul. 28, 1997

§ 102(e) Date: Jul. 28, 1997

[87] PCT Pub. No.: WO96/14270

PCT Pub. Date: May 17, 1996

[30] Foreign Application Priority Data

Nov. 7, 1994 [GB] United Kingdom .................. 9422401

[51] Int. Cl.$^6$ ..................................................... C01B 39/28
[52] U.S. Cl. ........................ 423/700; 423/709; 423/328.2
[58] Field of Search ..................................... 423/700, 709, 423/328.2, 333

[56] References Cited

U.S. PATENT DOCUMENTS

| | | | |
|---|---|---|---|
| 3,071,434 | 1/1963 | Frilette et al. .......................... | 423/709 |
| 4,385,042 | 5/1983 | Whitehurst et al. ..................... | 423/709 |
| 5,560,829 | 10/1996 | Adams et al. .......................... | 423/700 |
| 5,645,811 | 7/1997 | Kuhm et al. ............................ | 423/700 |

FOREIGN PATENT DOCUMENTS

| | | |
|---|---|---|
| 384 070 | 8/1990 | European Pat. Off. . |
| 565 364 | 10/1993 | European Pat. Off. . |
| 94/26662 | 11/1994 | WIPO . |
| 95/12546 | 5/1995 | WIPO . |
| 95/21125 | 8/1995 | WIPO . |

*Primary Examiner*—Mark L. Bell
*Assistant Examiner*—David Sample
*Attorney, Agent, or Firm*—Pillsbury Madison & Sutro LLP

[57] ABSTRACT

Process for manufacturing an alkali metal aluminosilicate of zeolite P type wherein a sodium silicate solution and a sodium aluminate solution are continuously added together in a first reacting zone in the presence of zeolite P seeds, to produce a first mixture said mixture being continuously transferred from this first reacting zone to a second reacting zone, the resulting product being eventually filtered, washed and dried.

3 Claims, No Drawings

5,904,914

ALUMINOSILICATES

This application is the national phase of international application PCT/EP95/04195, filed Oct. 24, 1995 which was designated the U.S.

FIELD OF THE INVENTION

The invention describes the preparation of alkali metal aluminosilicates, in particular crystalline aluminosilicates having the P-structure. These materials are of value as a component in detergent formulations in which they remove calcium and magnesium hardness ions by ion exchange. They also have other properties which provide additional benefits when used in detergent formulations. These aluminosilicates will be referred to as zeolite P in this description.

BACKGROUND OF THE INVENTION

While the utility of zeolite P in detergent formulations has been acknowledged, for example in European Patent Application 0384070 (Unilever), they must be manufactured by a commercially effective process in order to become available on the market place. Thus, while the properties of a material may make it a useful commercial commodity, its manufacture has to be optimised for large scale production. The zeolite P class includes a series of synthetic zeolite phases which may be in cubic configuration (also termed B or $P_c$) or tetragonal configuration (also termed $P_1$) but is not limited to these forms. The structure and characteristics of the zeolite P class are given in "Zeolite Molecular Sieves" of Donald W Breck (published 1974 and 1984 by Robert E Krieger of Florida USA). The zeolite P class has the typical oxide formula:

$$M_{2/n}O.Al_2O_3.2.0–5.00\ SiO_2.5H_2O.$$

M is an n-valent cation which for this invention is an alkali metal, that is lithium, potassium, sodium, caesium or rubidium with sodium and potassium being preferred and sodium being the cation normally used in commercial processes.

Thus sodium may be present as the major cation with another alkali metal present in a minor proportion to provide a specific benefit.

In EP-A-384,070 is disclosed a process for manufacturing zeolite P having a silicon to aluminium molar ratio not exceeding 1.33 wherein a sodium aluminate solution, having a $Na_2O:Al_2O_3$ molar ratio from 1.4 to 2.0, is mixed with a sodium silicate solution, having a $SiO_2:Na_2O$ molar ratio from 0.8 to 3.4, at a temperature from 25° C. to boiling point and with vigorous stirring to give a gel having the following composition:

$$(2.3–7.5)Na_2O,\ (1.75–3.5)SiO_2,\ Al_2O_3,\ (80–450)H_2O.$$

The gel is then aged for 0.5 to 10 hours at a temperature above 70° C., the crystalline sodium aluminosilicate thus formed being then washed and dried.

This process, with such a gel composition, even though being suitable for producing zeolite P on a bench scale, can't always be directly transposed to industrial scale.

In EP-A-565,364 is disclosed a process for industrial production of P zeolite having the oxide formula $$M_{2/n},\ Al_2O_3,\ (1.8–2.66)(preferably\ 1.90–2.10)SiO_2,\ yH_2O$$

wherein y is the water content, comprising the steps of:

i. a sodium aluminate solution having a temperature of at least 25° C. is mixed with a sodium silicate solution at a temperature of at least 25° C. in a stirred vessel in the presence of a slurry of P zeolite seed to form a gel having the composition, $Al_2O_3:(1–3.5)$(preferably 1.80–2.2)$SiO_2:(1.2–7.5)$ (preferably 1.5–5)$Na_2O$: (25 to 450) (preferably 40 to 150) $H_2O$ ii. ageing the gel at a temperature above about 25° C. with stirring to maintain solids in suspension for a period of least about 0.1 hour, and iii. separating the P zeolite product, washing and drying.

Even though satisfactory, this process is a batch process and there is therefore a need for a continuous process for the production of zeolite P.

STANDARD PROCEDURES

In the characterisation of the zeolite-P materials prepared by the present process the following methods were used.

i. The form of the zeolite which was produced was established using standard XRD method.

GENERAL DESCRIPTION OF THE INVENTION

It is a first object of the present invention to provide a process for manufacturing an alkali metal aluminosilicate of zeolite P type having the oxide formula $$M_{2/n}O,\ Al_2O_3,\ xSiO_2,\ yH_2O$$

x being at least 1.8 y being the water content, wherein a sodium silicate solution and a sodium aluminate solution are continuously added together in a first reacting zone in the presence of zeolite P seeds, to produce a mixture having the general formula:

$$3.0–5.0Na_2O,\ 2.2–7.5SiO_2,\ Al_2O_3,\ 75–450H_2O$$

the mixture being continuously transferred from this first reacting zone to a second reacting zone, the resulting product being eventually filtered, washed and dried.

Preferably, the invention relates to a process for manufacturing an alkali metal aluminosilicate of zeolite P type having the oxide formula $$M_{2/n}O,\ Al_2O_3,\ 1.8–2.66SiO_2,\ yH_2O.$$

By reacting zone it is understood a reacting vessel or a zone of a plug flow reactor as for example marketed by Power Fluidics, AEA Technology, Risley, Warrington, U.K.

In such a process, it is necessary, in order to work under viable economical conditions, to work as close as possible to the stoichiometric conditions, i.e the mixture obtained by adding together a sodium silicate solution and a sodium aluminate solution in the presence of zeolite P seeds should have a $SiO_2/Al_2O_3$ mole ratio as close as possible to 2.0.

Now, it has been found that, if the mixture obtained by adding together a sodium silicate solution and a sodium aluminate solution in the presence of zeolite P seeds has a $SiO_2/Al_2O_3$ mole ratio of less than 2.2, it is not possible to produce pure zeolite P. Instead of that, zeolite P and zeolite A are produced together. It has been found that it is nevertheless possible to produce pure crystalline zeolite P even from a mixture with a $SiO_2/Al_2O_3$ mole ratio of less than 2.2 and a $H_2O/Al_2O_3$ mole ratio of less than 150 if in a first reacting zone the mixture obtained by adding together a sodium silicate solution and a sodium aluminate solution in the presence of zeolite P seeds has a $SiO_2/Al_2O_3$ mole ratio of more than 2.2 and if, in a second reacting zone, a second sodium aluminate solution is added so as to give an overall $SiO_2/Al_2O_3$ mole ratio of less than 2.2.

Therefore, most preferably, the mixture obtained in the first reacting zone by adding together a sodium silicate solution and a sodium aluminate solution in the presence of zeolite P seeds has a $SiO_2/Al_2O_3$ mole ratio of more than 2.2 and, in the second reacting zone, a second sodium aluminate solution is added so as to give an overall $SiO_2/Al_2O_3$ mole ratio of less than 2.2 and a $H_2O/Al_2O_3$ mole ratio of less than 150.

SPECIFIC DESCRIPTION OF THE INVENTION

Examples of processes of the invention will now be given to illustrate but not limit the invention.

EXAMPLE 1

670 g of dilute alkaline solution (8.1% $Na_2O$) was placed in a 15 litre baffled flask. The solution was stirred (600 rpm) and heated to 95° C. To the stirred solution, dilute silicate solution (14.7% $SiO_2$, 9.4% $Na_2O$, 1% w/w of zeolite P seeds), preheated at 90° C., and dilute aluminate solution (9.13% $Al_2O_3$, 12.5% $Na_2O$) were simultaneously added at identical rate of 40 g/minute. The zeolite P seeds in the dilute silicate solution were produced as disclosed in EP-A-565, 364. After 40 minutes of addition, the addition rate of both silicate and aluminate solutions were reduced to 24 g/minute. When the reactor pot was about two third full, the mixture was transferred continuously to a 5 litre reactor at 95° C. at the rate of 48 g/minute. When the second reactor pot was two third full, the product was continuously withdrawn at the rate of 48 g/minute, leading to a residence time of 85 minutes. Samples were taken from the outlet pipe, filtered, washed an dried on an hourly basis. This continuous operation was maintained for 6 hours. The reaction mixture composition in this experiment was

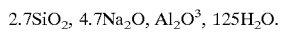

2.7$SiO_2$, 4.7$Na_2O$, $Al_2O^3$, 125$H_2O$.

The dried samples were analyzed by XRD and all the samples were crystalline zeolite P.

EXAMPLE 2

The procedure of example 1 was repeated except that 3 reactor pots were employed instead of 2. Samples were taken from the outlet pipe, filtered, washed an dried on an hourly basis. This continuous operation was maintained for 6 hours. The dried samples were also crystalline zeolite P.

EXAMPLE 3

The procedure of Example 1 was repeated with the following changes:

i) one reactor pot instead of two was used,
ii) after 40 minutes of 40 g/minute addition, the addition rate of both silicate and aluminate solutions were reduced to 18 g/minute and the outlet rate was reduced to 36 g/minute leading to a residence time of 110 minutes.

Samples were taken from the outlet pipe, filtered, washed an dried on an hourly basis. This continuous operation was maintained for 6 hours. The dried samples were also crystalline zeolite P.

EXAMPLE 4

The procedure of Example 3 was repeated with suitable increase in the $Al_2O_3$ concentration in the aluminate stream so as to obtain a gel composition with $SiO_2/Al_2O_3$ ratio of 2.0 instead of 2.7.

Samples were taken from the outlet pipe, filtered, washed an dried on an hourly basis. This continuous operation was maintained for 6 hours. Samples from this experiment gave zeolite A as a major phase and zeolite P as minor phase.

EXAMPLE 5

The procedure of example 4 was repeated with two reactor pots (as in Example 1) instead of one.

Samples were taken from the outlet pipe, filtered, washed an dried on an hourly basis. This continuous operation was maintained for 6 hours. Samples from this experiment gave zeolite A as a major phase and zeolite P as minor phase.

EXAMPLE 6

The procedure of example 2 was repeated except that a sodium aluminate solution (8.1% $Al_2O_3$, 21.5% $Na_2O$) line was introduced into the second pot reactor at 9 g/minute to give an overall gel composition as follows:

2.0$SiO_2$, 4.6$Na_2O$, $Al_2O_3$, 100$H_2O$.

Samples were taken from the outlet pipe, filtered, washed an dried on an hourly basis. This continuous operation was maintained for 6 hours. Samples from this experiment gave crystalline zeolite P.

I claim:

1. A process for manufacturing an alkali metal aluminosilicate of zeolite P type having the oxide formula

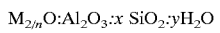

$M_{2/n}O{:}Al_2O_3{:}x\ SiO_2{:}yH_2O$ wherein M is an n-valent alkali metal;
x is at least 1.8; and
y is the water content, wherein a sodium silicate solution and a sodium aluminate solution are continuously added together in a first reacting zone in the presence of zeolite P seeds, to produce a mixture having the formula:

3.0–5.0 $Na_2O{:}2.2$–7.5 $SiO_2{:}Al_2O_3{:}75$–450 $H_2O$ the mixture being continuously transferred from the first reacting zone to a second reacting zone, the resulting alkali metal aluminosilicate of zeolite P type being filtered, washed and dried, a second sodium aluminate solution being added in the second reacting zone so as to give an overall $SiO_2/Al_2O_3$ mole ratio of less than 2.2 and a $H_2O/Al_2O_3$ mole ratio of less than 150.

2. Process as claimed in claim 1 in which the second sodium aluminate solution is added so as to give an overall $SiO_2/Al_2O_3$ mole ratio of about 2.0.

3. Process as claimed in claim 1 in which each reacting zone is provided by a zone of a plug flow reactor.

* * * * *